United States Patent [19]
Hoyle

[11] Patent Number: 5,180,112
[45] Date of Patent: Jan. 19, 1993

[54] DRIVE ARM FOR A SPREADER

[76] Inventor: David S. Hoyle, Main Road, Maungaturoto, New Zealand

[21] Appl. No.: 610,203

[22] Filed: Nov. 6, 1990

[30] Foreign Application Priority Data

Nov. 6, 1989 [NZ] New Zealand .............. 231278

[51] Int. Cl.⁵ .................. A01C 17/00; B60K 25/08
[52] U.S. Cl. ............................. 239/685; 239/673; 180/53.6
[58] Field of Search ............. 239/685, 673; 180/53.61, 53.6

[56] References Cited

U.S. PATENT DOCUMENTS

| | | | |
|---|---|---|---|
| 3,085,807 | 4/1963 | Tyler | 239/685 |
| 4,283,014 | 8/1981 | Devorak | 239/685 |

FOREIGN PATENT DOCUMENTS

| | | | |
|---|---|---|---|
| 112656 | 3/1941 | Australia | 239/685 |
| 1159486 | 12/1983 | Canada | 239/685 |
| 225606 | 8/1985 | Fed. Rep. of Germany | 239/685 |
| 808029 | 2/1981 | U.S.S.R. | 239/685 |

Primary Examiner—Andres Kashnikow
Assistant Examiner—Karen B. Merritt
Attorney, Agent, or Firm—Lyon & Lyon

[57] ABSTRACT

A substantially elongate drive arm for a vehicular spreader is provided to transmit drive from a ground wheel of the spreader to a drive shaft of the spreader connected with a conveyor belt or the like. A drive wheel is mounted on the drive arm and the drive arm and drive wheel pivot relative to the drive shaft to enable the drive wheel to engage with the ground wheel, the arrangement being such that in use a torque reaction occurs whereby forces of engagement urging contact between the drive wheel and the ground wheel increase as the load in the drive shaft increases.

8 Claims, 1 Drawing Sheet

DRIVE ARM FOR A SPREADER

FIELD OF THE INVENTION

This invention relates to a drive arm for a spreader. The drive arm may be used to activate a drive roller for a conveyor in the spreader.

BACKGROUND OF THE INVENTION

It is known to use vehicles, which have spreading devices to spread fertilizers and other particulate materials. In the case of a fertilizer spreader, typically the vehicle is a truck or trailer which carries a hopper for the fertilizer. A conveyor belt typically forms the floor of the hopper and, when the conveyor belt is activated, conveys the fertilizer to an exit at one end of the hopper. The exit usually is formed by a door which is slidable upwardly and downwardly to adjust the size of the opening forming the exit. In the usual case, fertilizer leaving the hopper falls onto a spreader device which spreads the fertilizer.

To date, a number of problems have been encountered with such spreaders. For instance, it has been found difficult to co-ordinate the rate of dispersal of the fertilizer with the speed of the spreader across the ground. This has been found to be particularly so where the drive for the conveyor is taken from a power-take-off or the like in the prime mover.

Steps have been taken to co-ordinate dispersal by linking the conveyor and other dispersal means to a ground wheel or the like of the spreader. However, typically such linkage as have been provided to date have included a number of drawbacks.

Indeed, typically the arrangements provided to date have been relatively complex in the manner in which the drive is transmitted to the dispersal means. This has made maintenance and repair in the field, when they have become necessary, relatively difficult to achieve.

Also, drive arrangements to date have been provided in a manner which leaves typically relatively complex gear trains and the like open or otherwise exposed to fertilizer, dust, mud and water action. Such action often leads to corrosion, and jamming and clogging, of the drive means.

It is an object of at least one embodiment of this invention to come some way in overcoming the above-mentioned problems or at least to provide the public with a useful choice. Other objects of this invention will become apparent from the following description.

SUMMARY OF THE INVENTION

According to one aspect of this invention there is provided a substantially elongate drive arm for a vehicular spreader, said drive arm mounted to extend substantially radially from a spreader drive shaft, a drive wheel provided on said drive arm being spaced from said drive shaft, said drive wheel and said drive shaft being connected by drive means to enable the transfer of driving forces therebetween, said drive arm pivotable relative to said drive shaft to engage said drive wheel with a ground wheel of said spreader to enable the transmission of a driving force from said ground wheel to said drive shaft, the arrangement being such that in use a torque reaction occurs in response to the action of the driving force on a load in said drive shaft whereby forces of engagement urging contact between the drive wheel and the ground wheel increase as the load increases.

Other aspects of this invention will become apparent from the following description of preferred embodiments of the invention. The description is given by way of example only and is not intended to be limiting of the scope of the invention as claimed herein. The description is made with reference to the drawings in which:

DETAILED DESCRIPTION OF THE PREFERRED EMBODIMENTS

Figure 1:
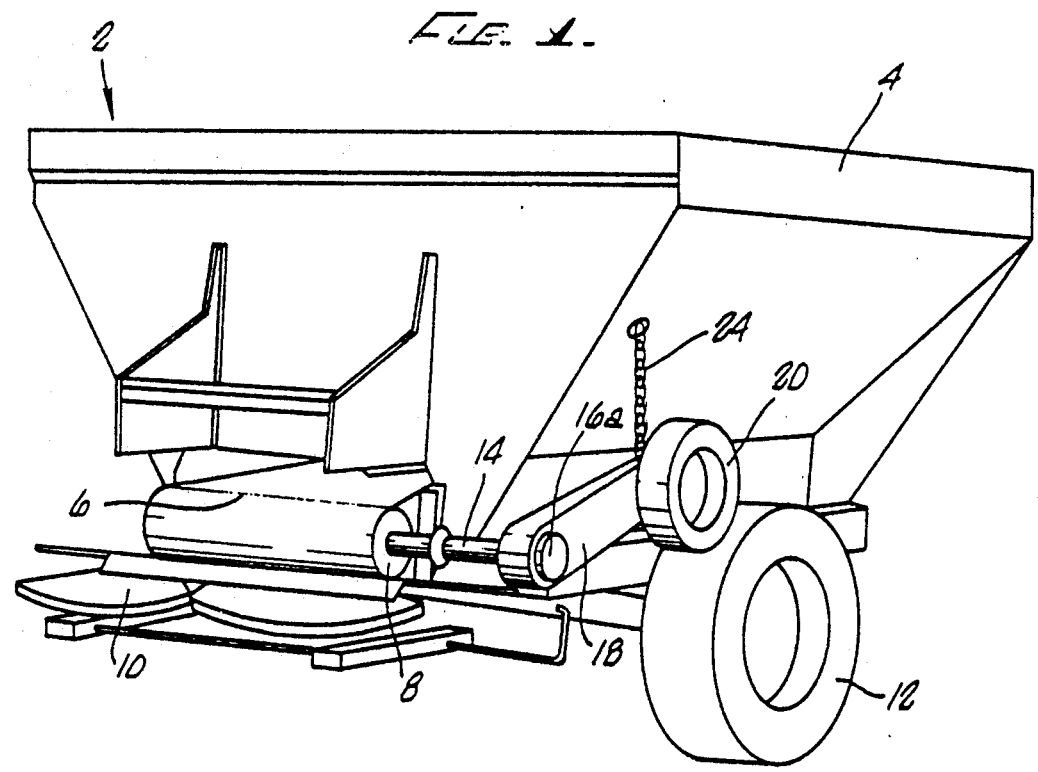
FIG. 1 is a perspective view of a spreader with a drive arm according to one example of this invention.
Figure 2:
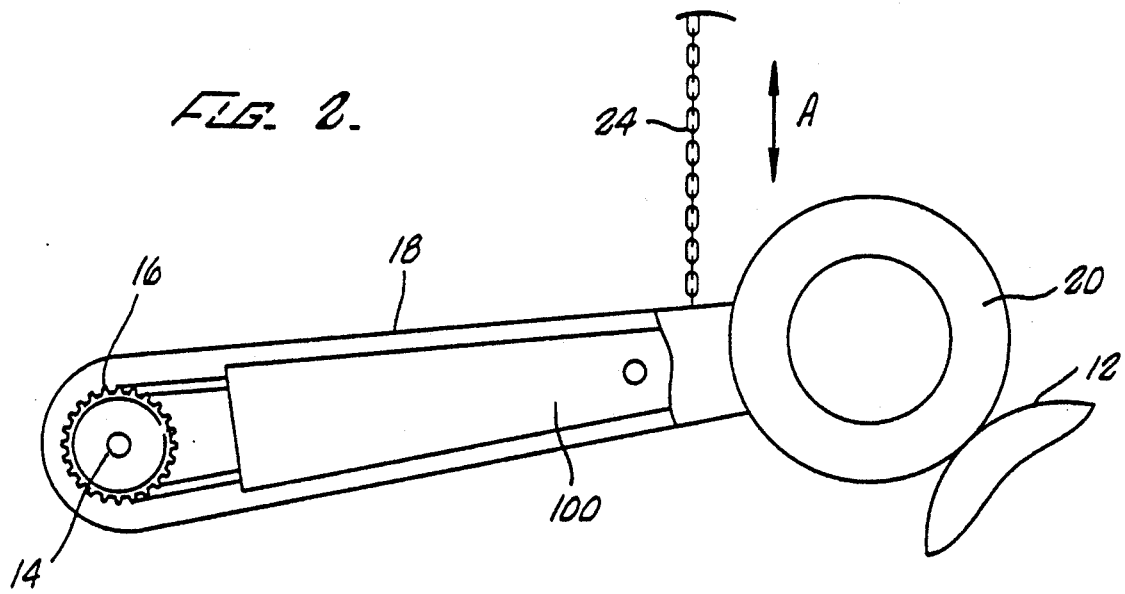
FIG. 2 is a partial cross-section of the exemplary drive arm.

In FIG. 1, spreader 2 comprises a hopper 4 and a conveyor belt 6 forming the floor of the hopper 4. The conveyor belt 6 is driven by a drive roller 8 at the discharge end of the hopper 4. Particulate matter discharging from the hopper 4 falls on a spreader device 10 which spreads the matter. The spreader device is conventional and will not be described further. The spreader 2 has a pair of ground wheels 12 upon which the spreader 2 is carried. Only one of the ground wheels 12 is shown in FIG. 1.

A roller drive shaft 14 extends from the drive roller 8 to a gear 16 encased within a drive arm 18. In FIG. 1, bearing case 16a can be seen.

A drive wheel 20 is mounted on drive arm 18 and spaced from drive shaft 14. In this example, drive wheel 20 contacts and engages with ground wheel 12.

Within drive arm 18, the drive means 100 could comprise a chain drive connecting the drive wheel 20 with the drive shaft 14 to enable transmission of the drive therebetween. Gears may link by chains the drive gear 16 and a similar gear on the drive wheel 20 (not shown). In this way, rotation of the drive wheel 20 causes the rotation of the drive means 100 and the roller drive shaft 14, which in turn rotates the drive roller 8.

Bearing casings may be used to mount the gears in the drive casing 18. Indeed, it is a feature of this example of the invention that the gear box formed by the drive casing 18 can be made by laser cutting—essentially, all that has to be done to mount the gears is to bore holes for the shafts; the shafts can then be aligned more accurately on bearings. Indeed, the holes are bored relatively oversized to allow mounting in this way. This feature of mounting the drive means on the casing means results in a relatively more efficient unit, both from a manufacturing and maintenance point of view.

Bearing casings 102 and 103 mount gears 22 and 26, respectively, in drive casing 18. Indeed, it is a feature of this example of the invention that the gearbox formed by drive casing 18 can be made by laser cutting—essentially, all that has to be done to mount the gears is to bore holes for the shafts; the shafts can then be aligned more accurately on bearings. Indeed, the holes are bored relatively oversized to allow mounting in this way. This feature of mounting the drive means on the casing means results in a relatively more efficient unit, both from a manufacturing and maintenance point of view.

The drive arm 18 comprises a substantially elongate casing which encloses the drive means provided by the chain drive arrangement of this example. In this example, the casing is removable from spreader 2 as a single unit. Preferably, the casing is formed in a suitable metal such as steel.

Chain 24 is connected between the drive arm 18, adjacent the drive wheel 20, and the hopper 4 above the drive wheel 20. Chain 24 is used to move the end of the drive arm 18 to which it is connected upwardly and downwardly in the direction shown by arrow A. In this manner, in this example the invention, the drive arm 18 is pivotable about an axis substantially coterminous with roller drive shaft 14.

When in use, the spreader 2 is transported to an area in which particulate matter is to be spread. During transportation, chain 24 is shortened and drive arm 18 raised. In this position the drive wheel 20 is raised from ground wheel 12.

To spread the particulate material, chain 24 is lengthened and casing 18 pivots to lower the drive wheel 20 to contact and engage with ground wheel 12. Then, as the spreader 2 is moved, the ground wheel 12 rotates and this in turn rotates the drive wheel 20. The rotational movement of drive wheel 20 is transferred to drive roller 8 as was described earlier.

Further, by virtue of the mounting of drive wheel 20 to be pivotable relative to drive shaft 14, a torque reaction occurs in use. This reaction is brought about in response to the action of driving forces transmitted from the drive wheel 20 to shaft 14 via drive means 100.

As the driving force acts on the load in drive shaft 14 provided by the weight of particulate material bearing on conveyor 6, so drive wheel 20 will be urged into contact and engagement with ground wheel 12. The torque reaction is such that, as the load on conveyor 6 increases, so the forces of engagement urging contact between drive wheel 20 and ground wheel 12, brought about by the torque reaction just mentioned, will increase.

Thus it will be appreciated that the arrangement has a number of practical advantages. The torque reaction means that the greater the load on drive shaft 14, the more drive wheel 20 will tend to engage with ground wheel 12 to assist the transmission of driving force to the drive shaft.

The mounting of the drive means on the casing means and the use of the casing means as the main structural element of the drive arm makes for relatively easy manufacture, maintenance and repair, particularly in the field. And, as the casing means substantially encloses the drive means, so the risk of adverse effects from fertilizer and other particulate material, mud, dirt and the like intruding into the drive means is reduced.

Though this invention has been described in relation to an exemplary embodiment, it should be well appreciated that modifications and improvements are envisaged and intended to be included within the scope of the invention as claimed herein without departing from it. For instance, the invention is not to be restricted to a drive arm for a trailer mounted spreader; the spreader may be mounted on a truck, for example.

What is claimed is:

1. A substantially elongate drive arm for a vehicular spreader, said drive arm mounted to extend substantially radially from a spreader drive shaft, a drive wheel provided on said drive arm being spaced from said drive shaft, said drive wheel and said drive shaft being connected by a drive means mounted on said drive arm to enable the transfer of driving forces therebetween, said drive arm pivotable in a first direction relative to said drive shaft to engage said drive wheel with a ground wheel of said spreader to enable the transmission of a driving force from said ground wheel to said drive shaft, said drive shaft being driven rotatably in a second direction opposite to said first direction such that in use a torque reaction occurs in response to the action of the driving force on a load in said drive shaft whereby forces of engagement urging contact between the drive wheel and the ground wheel increase as the load increases.

2. A drive arm as claimed in claim 1 wherein said drive means is mounted on casing means.

3. A drive arm as claimed in claim 2 wherein said casing means provides the main structural element of said drive means.

4. A drive arm as claimed in claim 3 wherein said casing means substantially encloses said drive means.

5. A drive arm as claimed in claim 4 wherein said drive means includes chain drive means.

6. A drive arm as claimed in claim 5 wherein lifting means are provided to lift said drive wheel out of engagement with said ground wheel.

7. A drive arm as claimed in claim 1 wherein lifting means are provided to lift said drive wheel out of engagement with said ground wheel.

8. A vehicular spreader comprising
a spreader body;
a spreader drive shaft;
at least one ground wheel supporting said spreader body;
a drive arm mounted to extend substantially radially from said spreader drive shaft;
a drive wheel provided on said drive arm displaced from said drive shaft;
a gear drive mounted on said drive arm and coupled with said drive wheel and said drive shaft, said drive arm being pivotable in a first direction relative to said drive shaft to engage said drive wheel with said ground wheel to enable transmission of a driving force from said ground wheel to said drive shaft, said drive shaft being driven rotatably in a second direction opposite to said first direction.

* * * * *